No. 758,598.  
PATENTED APR. 26, 1904.  
J. S. RICHMOND.  
TRANSMISSION OF ELECTRICAL IMPULSES.  
APPLICATION FILED SEPT. 16, 1903.  
NO MODEL.
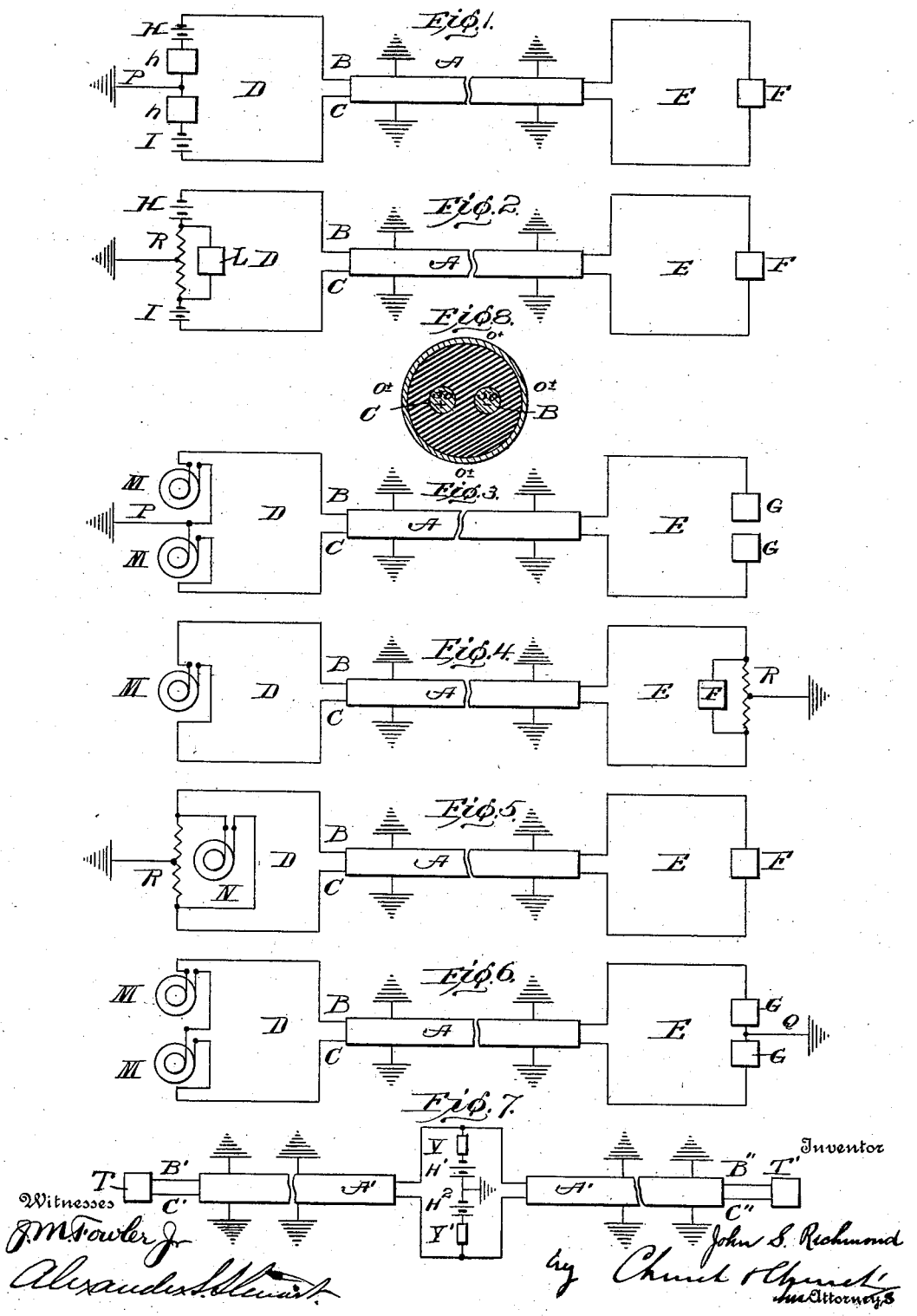

No. 758,598. Patented April 26, 1904.

UNITED STATES PATENT OFFICE.

JOHN STANLEY RICHMOND, OF NEW YORK, N. Y.

TRANSMISSION OF ELECTRICAL IMPULSES.

SPECIFICATION forming part of Letters Patent No. 758,598, dated April 26, 1904.

Original application filed April 27, 1901, Serial No. 57,821. Divided and this application filed September 16, 1903. Serial No. 173,430. (No model.)

*To all whom it may concern:*

Be it known that I, JOHN STANLEY RICHMOND, a subject of His Britannic Majesty King Edward VII, residing at New York, in the borough of Manhattan and State of New York, have invented certain new and useful Improvements Relating to the Transmission of Electrical Impulses; and I do hereby declare the following to be a full, clear, and exact description of the same, reference being had to the accompanying drawings, forming a part of this specification, and to the letters of reference marked thereon.

This application is a division of my prior application, Serial No. 57,821, filed April 27, 1901, and the invention relates to the art of transmitting electrical impulses through electrical transmission mediums, and more especially such impulses as are utilized in the arts of telegraphy and telephony, although not restricted to these arts, the objects of the invention being to enable such impulses to be transmitted through long cables, submarine or otherwise, and to render their transmission through short cables more expeditious and efficacious.

The transmission of electrical impulses, particularly in telegraphy and telephony, has hitherto been effected by what I term "single" transmission—*i. e.*, the transmission of electrical impulses produced telephonically, telegraphically, or otherwise with one generating device through one circuit, (metallic or otherwise,) in which case capacity has proven to be highly detrimental, especially where a cable or cables form a portion or portions of the working circuit or circuits. To prevent detrimental inductive effects, certain conditions must be established in the cable—that is to say, the sheath of the cable being zero potential or the potential of the earth the impulses in the conductor or conductors must at contiguous points be in potential equally above and equally below the zero potential or potential of the sheath. Obviously the desired end cannot be attained with a single-wire earth-return nor with a metallic circuit unless the impulses in the two conductors at contiguous points be in potential equally above and equally below the potential of the sheath, and this can only be attained by a system in which the two conductors of a metallic circuit have an equal capacity in regard to the sheath, and when the meeting-points of the two halves of the system, one of which includes one conductor and the other the other conductor, are maintained at the zero potential, which points may be termed the "medial" points. If these medial points be not so maintained, then while the impulses in the conductors may be respectively above and below a potential intermediate to the potential in the conductors themselves, yet that intermediate potential may not correspond to the zero potential, and if not the aforesaid detrimental effects will occur.

In carrying out the present invention I employ what I term a "double transmission"—that is, the transmission through two contiguous transmission mediums of equal impulses simultaneously varied in equal ratio, the impulses at contiguous points in the two transmission mediums being simultaneously equal in potential measured from the zero potential, but differing in this, that the potential of the one is above and that the potential of the other is below such zero potential, whereby no detrimental capacity effects are produced in so far as the impulses being transmitted are concerned. In other words, in accordance with my invention the cable, considered as a condenser within a sheath or shield, has its contiguous points when in operation in an ideal condition from a charged-condenser point of view, which condition cannot result in any detrimental so-called "capacity" effect, which detrimental so-called "capacity" effect is but the attempt of a cable-condenser to attain such ideal condition, which ideal condition cannot be established or maintained by transmission as heretofore practiced.

In the practical application of the invention two contiguous conductors are employed forming the transmitting media of the line, such conductors being as nearly as practicable similar in all respects, especially as to their resistance and their capacity considered as a condenser, the medial points where such transmitting media meet to form the circuit being maintained at the potential of the medium contiguous to, but insulated from, the conductors, such as the cable-sheath, by an earth connection, and in connection with such conductors there are provided means for transmitting through said conductors impulses simultaneously equal at contiguous points in the conductors, but of opposite potential with respect to the zero potential or potential of the medium surrounding, but insulated from, the conductors, and means for making the impulses manifest at the receiving-station.

In the drawings illustrative of the invention Figures 1, 2, 3, 4, 5, 6, and 7 are diagrammatic illustrations of the application of the present invention to an impulse-transmitting system or systems. Fig. 8 represents a cross-section at a point in a cable when the impulses in the conductors at such a point are respectively 50− and 50+.

In said drawings the cable portion of the system is indicated by the letter A, while two conductors in the cable, forming portions of a pair of transmitting mediums, are indicated by the letters B and C, such conductors being equal and so arranged in the cable as to have from a condenser point of view equal capacities under equally-influencing conditions—that is, arranged in the same relation to the sheath $a$ of the cable as shown in Fig. 8—in other words, having their points of similar proximity to the sheath equal, &c. Cables having two or more pairs of wires should have the core constructed similar to those diagrammatically illustrated on page 466 of a work entitled *A Manual of Telephony*, by Preece and Stubbs, edition of 1898. The cable A extends between the two stations, and, as shown, the transmitting-stations are indicated by the letter D and receiving-stations by the letter E; but while the drawings show a transmitting-station at one end and a receiving-station at the other end it will be understood that each station may be both a transmitting and a receiving station. The conductors B and C are as nearly as practicable of the same resistance and as equal as possible in all respects. They form, respectively, portions of the two transmitting mediums, which mediums when joined together at each end form a working circuit, and any instrument introduced into or influencing one transmission medium has its counterpart in the other transmission medium, the object being to have both transmission mediums, considered from the medial points or points where the two transmission mediums meet, in all respects equal to each other. With this object in view the receiving instrument or instrumentality for making the impulses manifest or the impulse-creating instrumentality may be introduced as a bridge between two points, one in each transmission medium, such points being electrically equidistant from the meeting-point of the two transmission mediums, in which case when operative one medial point would be at the center of the instrument, as shown, for instance, by the diagrammatic illustration of the receiving instrument F, Figs. 1, 2, 4, and 5.

If so desired, two receiving instruments may be introduced, one on each side of the medial point, as shown by G G in Figs. 3 and 6, either or both of which instruments may be utilized. At the transmitting-station similar conditions are established—that is to say, the instrument for creating the impulses may bridge points electrically equidistant from the medial point or an instrument be located on each side of the medial point.

The impulses may be created by a primary generator, such as a dynamo, or by an impulse instrumentality in conjunction with current-generating means. In Figs. 1 and 2 equal batteries H and I, located in the respective transmission mediums, are shown, the impulse-creating instrumentality in Fig. 1 being transmitting instruments K K, one located on each side of the medial point. In Fig. 2 a single transmitting instrument L, bridging points electrically equidistant from the medial point, is shown. In Figs. 3 and 6 two dynamos M M are shown, one on each side of the medial point. In Figs. 4 and 5 a single dynamo N is shown, bridging points electrically equidistant from the medial point.

The balanced conditions having been established, then when the circuit is working the tension in one conductor may be said to be + potential and that in the other − potential; but in cable-work to a large extent and in other work to a lesser extent condenser conditions are encountered, and this not only between the conductors, but also between the conductors and the medium surrounding and more or less insulated from them. In cable-work such surrounding medium insulated from the conductors is the sheath. The potential of such sheath must therefore be taken into account, and to prevent detrimental condenser effects the potential in the respective conductors must at every contiguous point be simultaneously as equally above (+) in the one as that in the other is below (−) the zero (0± or 0) potential of the sheath of the cable. As illustrated, this is accomplished through establishing an unvarying zero (0±) potential at the medial points in the system, as by a ground or earth connection, which may be the connection P from the medial point at the transmitting-station, as in Figs. 1 and 3, or the connection Q from the medial point of the receiving-station, as in Fig. 6. The desired result may be accomplished by a ground or earth connecting the middle point electrically, of a resistance bridging points electrically equidistant from the medial point when in operation, especially where the transmitting instrument is located at the medial point, such resistance acting as a shunt and so arranged that sufficient so-called "electricity" shall operate in the transmitting instrument or the receiving instrument if the earth or ground connection is located at the receiving-station. Figs. 2, 4, and 5 illustrate such an arrangement. In Figs. 2 and 5 each earth connection is made to the middle point of the resistance R, which resistance R bridges points electrically equidistant from the medial point situated in the transmitting instrument.

Fig. 7 is a diagrammatic illustration of the application of the invention to a common battery telephonic system showing two subscribers. T T' are subscribers' sets, B' C' and B'' C'' being two conductors passing through the cables A' A'. B' and B'' are connected, through a retardation-coil Y, to a battery H'. C' and C'' are connected, through a retardation-coil Y', to a battery $H^2$, equal to H'. The remaining terminals of H' and $H^2$ are connected together and such connection connected to earth.

Having thus described my invention, what I claim as new, and desire to secure by Letters Patent, is—

1. The hereinbefore - described improvement in the art of electrical transmission which consists in producing in adjacent conductors electrical impulses simultaneously equal at contiguous points but differing in this that the potential of the one is above and that of the other equally below the maintained zero potential; substantially as and for the purposes set forth.

2. The described improvement in the art of electrical transmission which consists in the transmission through contiguous conductors capable, under similar electrical conditions, of similar capacity effects, of electrical impulses simultaneously equal at contiguous points and simultaneously varied in equal ratio as regards the two conductors, but differing in this: that, simultaneously and at contiguous points, the potential established in one of the conductors is above while that in the other is equally below the potential of the medium surrounding the conductors; substantially as described.

3. The hereinbefore - described improvement in the art of electrical transmission which consists in maintaining zero potential at the meeting-point of adjacent conductors, and simultaneously producing in said conductors electrical impulses simultaneously equal at contiguous points but differing in this that the potential in the one conductor is above and that in the other equally below the maintained zero potential; substantially as described.

4. The described improvement in the art of electrical transmission which consists in the transmission through contiguous conductors forming parts of a single circuit, of impulses inaugurated by transmitting instrumentalities common to the two transmission mediums, said impulses differing in this: that, simultaneously and at contiguous points, the potential established in one of the conductors is above while that in the other is equally below maintained zero potential; substantially as described.

JOHN STANLEY RICHMOND.

Witnesses:
S. W. HUFF,
B. M. FLOURNEY.